INVENTOR.
DOUGLAS J. HAMILTON.
BY
A. M. Fernandez
Louis P. L. Olmgren
ATTORNEYS.

Sept. 17, 1963 D. J. HAMILTON 3,104,330

CLOCK PULSE DISTRIBUTION SYSTEM FOR SYNCHRONOUSLY DRIVING A PLURALITY OF FLIP-FLOPS

Filed Feb. 11, 1960 3 Sheets-Sheet 2

INVENTOR.
DOUGLAS J. HAMILTON.
BY
A. M. Fernandez
Louis P. Elbinger
ATTORNEYS.

INVENTOR.
DOUGLAS J. HAMILTON.
BY
A. M. Fernandez
Louis P. Elbinger
ATTORNEYS.

United States Patent Office 3,104,330

Patented Sept. 17, 1963

3,104,330

CLOCK PULSE DISTRIBUTION SYSTEM FOR SYNCHRONOUSLY DRIVING A PLURALITY OF FLIP-FLOPS

Douglas J. Hamilton, Tucson, Ariz., assignor to General Electric Company, a corporation of New York Filed Feb. 11, 1960, Ser. No. 8,079
5 Claims. (Cl. 307—88.5)

This invention relates to a system for distributing synchronizing clock pulses in digital computers and data-processing systems.

In synchronous digital computers and data-processing systems, a large number of binary memory elements are connected together by logic elements or circuits so that computations and manipulations of data may be made by transferring data from predetermined binary memory elements to other binary memory elements in accordance with a routine prepared by a programmer. If the operation of the machine is to be synchronous, it is necessary to synchronize the transfer of data by either gating the memory elements or the logic circuits with clock pulses.

It seldom happens that all of the data stored is to be transferred during the same time or clock period but it would not be unusual for at least half of the data to be transferred during a given clock period. For example, in a machine having about four-hundred binary memory elements or flip-flops, it would not be unusual to simultaneously trigger two hundred of them.

To synchronize the triggering of that many flip-flops with clock pulses from a single generator creates several problems, particularly at a high clock rate of from 250 kc./sec. to 400 kc./sec. or higher. For instance, the clock pulse for a system having a clock rate of 250 kc./sec. may be specified to have a ten-volt amplitude with a rise time no greater than 0.2 microsecond. If the input capacitance of each clock pulse gating circuit in the system is about $200\times10^{-12}$ farads, the current required to gate one flip-flop is:

$$i=c\frac{dv}{dt}$$

$$i=\frac{200\times10^{-12}\times10}{0.2\times10^{-6}}$$

$$i=10 \text{ milliamperes}$$

Accordingly, the pulse of current required to gate two-hundred flip-flops is two amperes, which is a large pulse of current to switch to the gated flip-flops from a single clock pulse source in less than two-tenths of a microsecond, particularly with transistor switching circuits. Moreover, attempts to transmit pulses with wavefronts having a slope or risetime of fifty volts per microsecond through more than a foot or two of open wiring usually result in objectionable transients due to the self-inductance and stray capacitance of the wiring which may cause spurious triggering of the flip-flops. To provide a plurality of synchronized clock pulse sources to satisfy the load requirement presents many difficult problems in maintaining synchronous operation of all sources.

A further problem is encountered in designing the logic for a computer or data-processing system when it is necessary to provide some means for interrupting the application of clock pulses to certain sections. For example, it may be desirable to operate a shift register only during certain portions of a routine.

Accordingly, an object of this invention is to provide a clock pulse distribution system for simultaneously transmitting a clock pulse to many loads such as gated flip-flops from a single source.

Another object is to provide a clock pulse distribution system wherein the distribution of clock pulses to certain loads may be selectively interrupted without affecting the distribution of clock pulses to other loads.

The objects of this invention may be realized by providing a master clock pulse driver capable of driving a plurality of other similar clock pulse drivers simultaneously. Each clock pulse driver connected to the master clock pulse driver is capable of simultaneously driving a plurality of other clock pulse drivers, each of which is capable of driving a plurality of loads such as gated flip-flops. Selected clock pulse drivers connected to certain ones of the loads may be gated to selectively interrupt the distribution of clock pulses to particular loads. A single clock pulse generator is provided to drive the master clock pulse driver at the desired clock pulse rate.

Other objects and advantages will become apparent from the following description with reference to the accompanying drawings in which.

Figure 1:
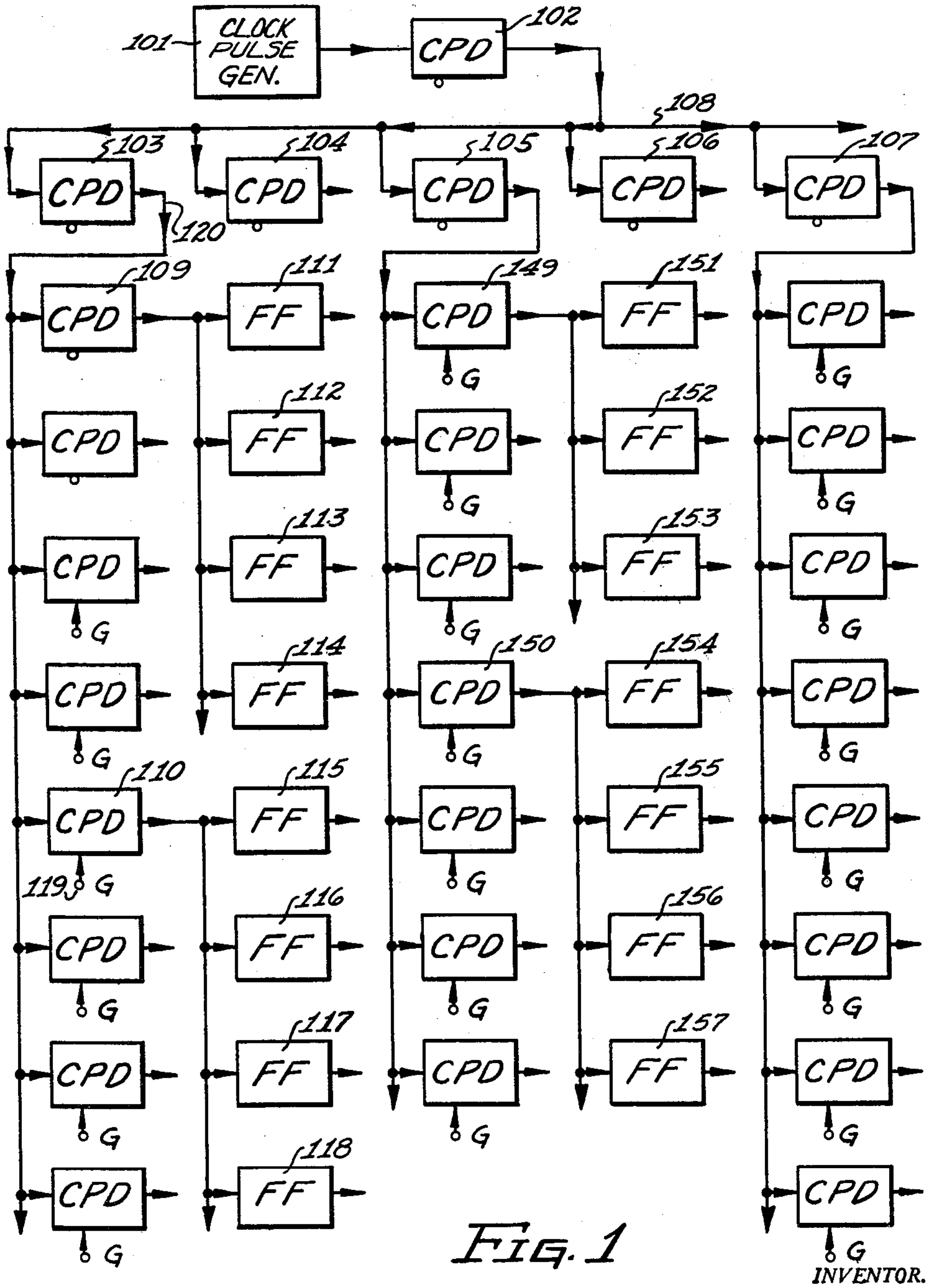
FIG. 1 illustrates schematically an embodiment of the present invention.

Before describing an embodiment of the present invention as illustrated schematically in FIG. 1, a clock pulse generator and clock pulse driver employed therein will be described with reference to the circuit diagrams illustrated in FIGS. 2 and 3. The system will function with these circuits or with other similar circuits well known in the art; therefore this invention is not to be considered as limited to the employment of the specific circuits shown. Illustrated with the circuit diagram of the clock pulse driver are symbols representative thereof. These symbols are employed for simplicity in the illustration of the invention in FIG. 1. The clock pulse generator is represented in FIG. 1 by a symbol consisting of the legend Clock Pulse Gen. in a block.

In the diagrams for the circuits, specific values of the circuit components are shown. These values are not to be considered as limiting because the particular circuits illustrated will often function satisfactorily with considerable variation from the values provided.

*Clock Pulse Generator*

Figure 2:
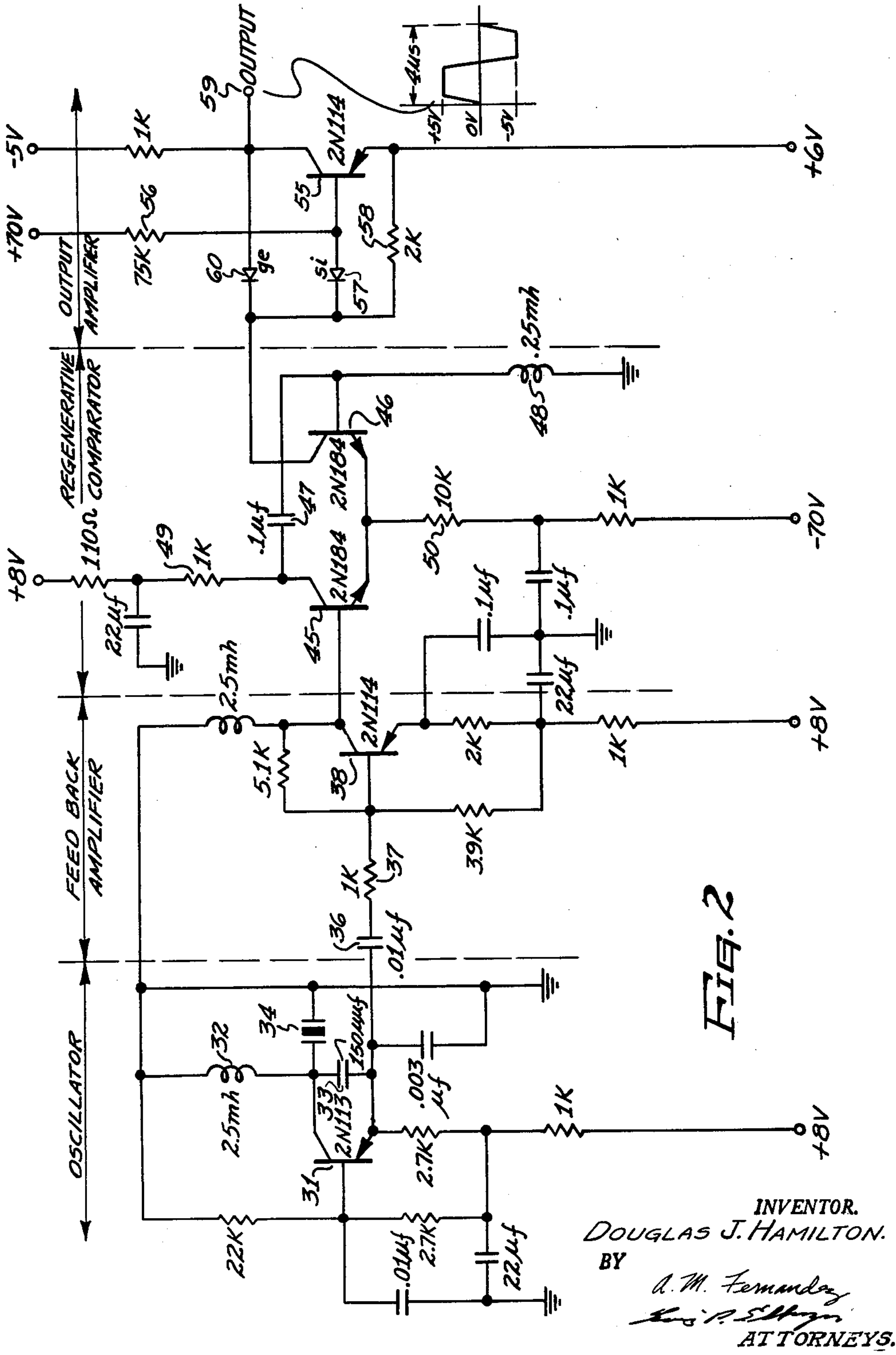
FIG. 2 illustrates a clock pulse generator circuit.

The clock pulse generator of FIG. 2 provides signals for clock pulse drivers located throughout the system at a repetition rate of 250 kc./sec. It comprises the following four circuits connected in tandem: a crystal controlled oscillator, a feedback amplifier, a regenerative comparator and an output amplifier.

The oscillator includes a PNP transistor 31 coupled to a resonant circuit comprising an inductor 32 and a capacitor 33. The approximate frequency of oscillation is determined by the resonant frequency of the inductor 32 and the capacitor 33 but a crystal 34 coupled to the resonant circuit locks the oscillator at the desired frequency. A sine wave output signal is taken from the emitter electrode of the transistor 31.

The output signal of the oscillator is transmitted through a capacitor 36 and a resistor 37 to the base electrode of a PNP transistor 38 of the feedback amplifier. The feedback amplifier is designed to have substantial voltage gain so that its output signal delivered at the collector electrode of the transistor 38 is a sine wave having an amplitude of approximately 1 volt peak-to-peak.

The output signal of the feedback amplifier is applied directly to the base electrode of a transistor 45 of the regenerative comparator. The regenerative comparator is a circuit which delivers a substantially square wave in response to the received sine wave. The regenerative comparator operates in the following manner. During the portion of the cycle of operation when the input signal is negative with respect to ground but is increasing positively, the transistor 45 is held cut off and a transistor 46 is conducting. In this state, the base electrode of the transistor 46 is at 0 volt or ground. The collector electrode of the transistor 45 is at +8 volts and a capacitor 47 is charged to +8 volts. The emitters of both of the NPN transistors 45 and 46 will be a fraction of a volt negative with respect to ground because the transistor 46 is conducting. As the input voltage applied to the base electrode of the transistor 45 increases positively and becomes slightly positive with respect to the emitter of the transistor 45, the transistor 45 becomes forward biased and its collector commences to conduct current. Thereupon, a sharp regenerative action ensues and the transistor 45 turns on sharply while the transistor 46 turns off sharply. During this regenerative action, the negative swing at the collector electrode of the transistor 45 is coupled through the capacitor 47 to the base electrode of the transistor 46. As the emitter current of the transistor 46 decreases, the emitter voltage thereof becomes more negative, increasing the forward bias of the transistor 45 and sustaining the regenerative action. The time constant of the capacitor 47, an inductor 48 and a resistor 49 is adjusted so that the sharp negative pulse at the base electrode of the transistor 46 terminates in about 2 microseconds.

The transistor 45 continues to conduct and the transistor 46 remains non-conducting during the portion of the cycle of operation when the input signal is positive with respect to ground. After the input signal has passed its most positive value and begins decreasing, all of the switching transients terminate and the base electrode of the transistor 46 is again at 0 volt. The emitter electrodes of the transistors 45 and 46, which follow the base of the transistor 45, are only a fraction of a volt less positive than the positive voltage applied at that time to the base electrode of the transistor 45; therefore the transistor 46 is reverse biased during the positive half cycle of the input signal applied to the base of the transistor 45. When the input signal decreases sufficiently to drive the emitter of the transistor 45 slightly negative with respect to ground, the transistor 46 becomes forward biased and commences to conduct. As the emitter current of transistor 46 starts to increase, the increasing voltage drop across a common emitter resistor 50 decreases the forward bias of the transistor 45. As the emitter current of the transistor 45 decreases, the collector current thereof decreases, allowing the collector voltage to swing positively. The positive swing at the collector electrode of transistor 45 is coupled by the capacitor 47 to the base electrode of transistor 46, causing a sharp regenerative action which cuts off the transistor 45 very rapidly and drives the transistor 46 to saturation very rapidly. As the input voltage now continues in its negative half cycle, the transistor 46 continues conducting and the transistor 45 is held non-conducting.

While the transistor 46 is conducting, its emitter current is relatively constant; therefore square waves of current appear at its collector electrode. Because of the regenerative action, the slope of the leading edge of the current waveform will depend very little on the amplitude of the input signal applied to the base electrode of transistor 45 and will depend almost entirely on the circuit parameters of the regenerative comparator.

The signal produced at the collector electrode of the transistor 46 is employed as an input signal to an output amplifier which isolates the regenerative comparator from the clock pulse generator load, produces sufficient power to drive a capacitive load and still preserves a step wavefront. When the collector current of the transistor 46 is zero, a PNP transistor 55 of the output amplifier is maintained cut off by the current passing through a biasing network consisting of a resistor 56, a silicon diode 57 and a resistor 58. At that time the clock pulse generator output signal at a terminal 59 is −5 volts. When the transistor 46 is conducting, the potential at its collector electrode is sufficiently negative to provide a forward bias for the transistor 55 which thereupon conducts. When the transistor 55 conducts, the potential at the output terminal 59 is approximately +5 volts. The combination of the silicon diode 57 and a germanium diode 60 prevents the transistor 55 from saturating, thus insuring more rapid cutoff of the transistor 55 when the transistor 46 is cut off.

An approximate waveshape derived from the output signal at the output terminal 59 is illustrated in the waveform immediately below the output terminal 59.

*Clock Pulse Driver*

Figure 3:
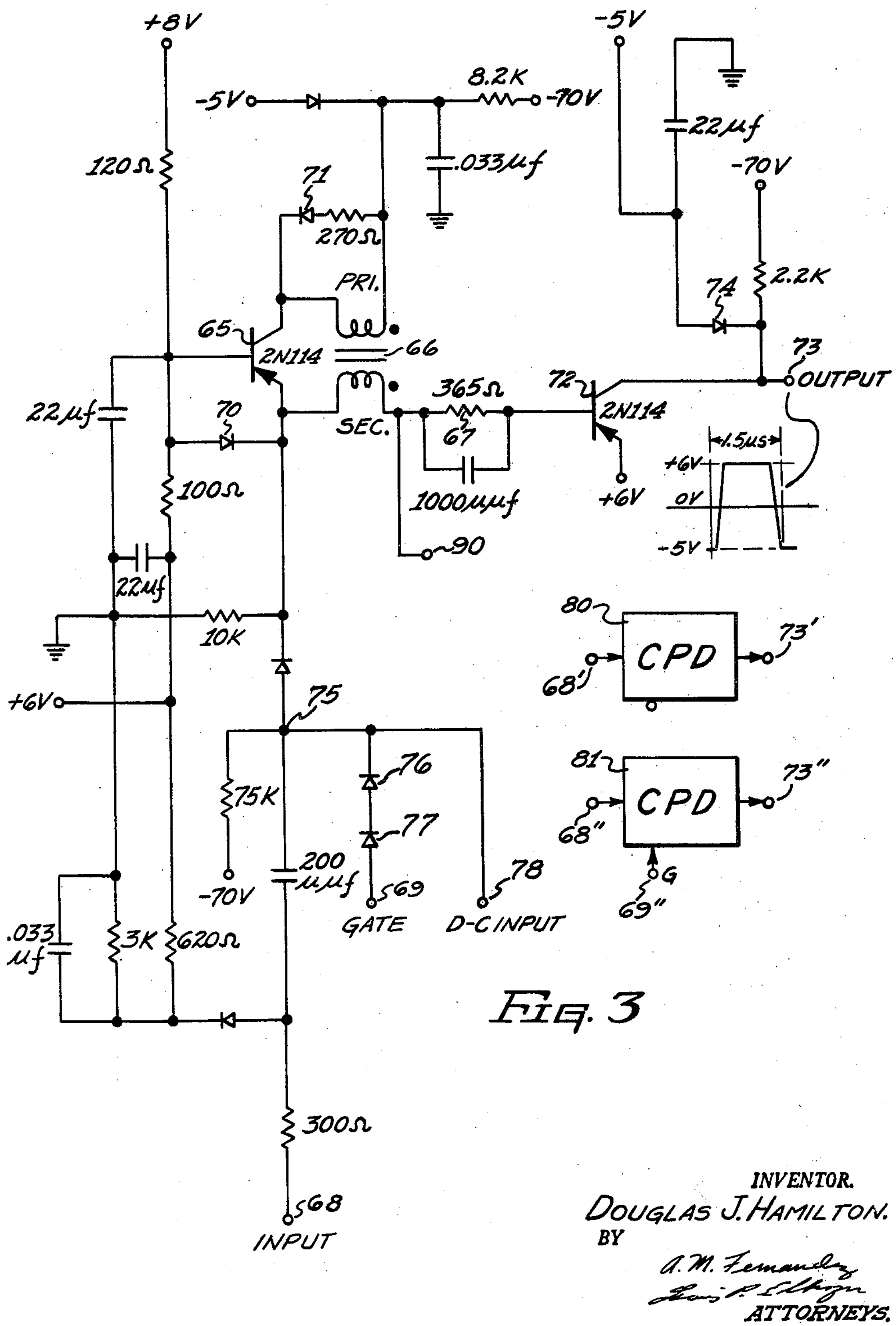
FIG. 3 illustrates a clock pulse driver circuit and shows two symbols employed to represent clock pulse driver circuits.

The clock pulse driver illustrated in FIG. 3 is a regenerative transistor switch which provides clock pulse signals that may be employed to drive either other clock pulse drivers, or the loads of the clock pulse distribution system such as flip-flops. It should be understood that the circuit of each clock pulse driver in the system is the same as the one illustrated and that although a regenerative transistor switch is illustrated, a non-regenerative transistor switch may also be employed as a clock pulse driver. It should be further understood that other suitable regenerative or non-regenerative switches designed with active elements other than transistors may also be employed.

The clock pulse driver responds to positive clock pulse signals supplied by a clock pulse generator or another clock pulse driver to generate corresponding clock pulses. Each clock pulse driver may be gated to provide either interrupted clock pulses or continuous clock pulses at a 250 kc./sec. rate. While a clock pulse driver is gated on, a clock pulse is transmitted for each clock pulse signal received, but while gated off, clock pulses are not transmitted.

The clock pulse driver, which is basically a triggered blocking oscillator with an output amplifier, will now be described with reference to FIG. 3. A PNP transistor 65, a transformer 66, a resistor 67 and associated biasing and power supply circuits comprise the blocking oscillator portion of the clock pulse driver. A clock pulse signal received at an input terminal 68 triggers the blocking oscillator to produce an output clock pulse. The input clock pulse signal is only effective to trigger the blocking oscillator if it is not gated off by a −5 volt signal applied to a gate terminal 69 which is normally maintained at +6 volts.

In the quiescent state, the base electrode of the transistor 65 is at approximately +6.7 volts and the transistor 65 is cut off due to the reverse bias supplied by the conduction of a diode 70. The clock pulse signals at the input terminal 68 have a peak-to-peak swing from −5 volts to +5 volts, a total excursion of ten volts. While the gate input terminal 69 is at +6 volts, an input clock pulse signal has sufficient amplitude to overcome the reverse bias applied to the transistor 65 through the diode 70 and to initiate the flow of emitter current in the transistor 65. Collector current then flows through the primary winding of the transformer 66 and induces a current to flow in the secondary winding in a direction to apply a positive voltage to the emitter electrode of the transistor 65. This positive voltage causes the emitter electrode to conduct more heavily and allows more current to flow through the primary of the transformer 66. This regenerative action will quickly drive the transistor 65 into saturation so that substantially all of the applied voltage is developed across the primary winding of the transformer 66. The large voltage induced across the secondary winding of the transformer 66 drives a PNP transistor 72 of the output amplifier into saturation so that only the resistor 67 limits the flow of emitter current in the transistor 65. Since the total applied voltage appears across the primary winding of the transformer 66, the collector current of the transistor 65 rises linearly toward the maximum allowable value of collector current as determined by the emitter current. The time for this current to rise to its maximum value is determined by the inductance of the transformer 66.

When the collector current of the transistor 65 reaches its maximum value, the opposite voltage induced in the secondary winding of the transformer terminates. An opposite regenerative action takes place and the transistor is rapidly cut off. A diode 71 is provided in an impedance branch across the transformer primary terminals to provide a discharge path for the current in the primary winding of the transformer when the transistor 65 is cut off.

While the transistor 65 is conducting, the transistor 72 is conducting at saturation and the clock pulse driver output signal at a terminal 73 is at approximately +6 volts. While the transistor 65 is not conducting, the transistor 72 is cut off and the output terminal 73 is clamped by a diode 74 at −5 volts. The clock pulse output signal is illustrated immediately below the output terminal 73.

Since the transistor 72 does conduct at saturation, a large number of minority carriers are stored in its base region; therefore, when the base current of the transistor 72 is abruptly terminated, the carriers stored in the base region must all be moved through the base by diffusion before the collector current of the transistor 72 is cut off. To decrease the time required for the minority carriers to diffuse through the base, reverse base current is provided by the secondary winding of the transformer 66. When the transistor 65 is cut off during the regenerative process at the end of the pulse applied to the input terminal 68, the dotted end of the secondary winding swings negative with respect to ground and forward biases the diode 70 to permit a large reverse base current to sweep out the minority carriers in the base region of the transistor 72. In that manner the minority carrier storage time is decreased and the switching time of the transistor 72 improved.

The manner in which a clock pulse driver is gated will now be described. When the clock pulse driver is gated off by the application of a −5 volt signal to the gate terminal 69, −6 volts is provided at a junction 75 because two diodes 76 and 77 produce a combined forward voltage drop of about 1 volt. The receipt of an input clock pulse signal at the input terminal 68 will produce a voltage swing of only +10 volts at the junction 75 and will therefore drive the emitter electrode of the transistor 65 to only +6 volts. Inasmuch as the base electrode of transistor 65 is at +6.7 volts, the transistor will not conduct and a clock pulse will not be regenerated. Accordingly, an output clock pulse will be transmitted only when the clock pulse driver is enabled by the application of a +6 volt signal to the gate input terminal 69.

If the clock pulse driver is to operate continuously and to provide an output clock pulse at a continuous 250 kc./sec. rate, a +6 volt, D.-C. bias is applied to an input terminal 78 to continuously enable the clock pulse driver and lock out the gate input circuit.

Two symbols as shown in FIG. 3 are employed to represent a clock pulse driver in the system of FIG. 1. Symbol 80 represents a continuous or ungated clock pulse driver. Clock pulse signals received at an input terminal 68′ are regenerated and transmitted through an output terminal 73′. The symbol 81 represents a gated clock pulse driver. Clock pulse signals received at an input terminal 68″ are regenerated and transmitted to an output terminal 73″ only while a +6 volt gating signal is applied to a gate terminal 69″ and not while a −5 volt gating signal is applied thereto.

Each clock pulse driver may drive as many as ten clock pulse drivers or ten or more gated flip-flops, depending on the gated flip-flop circuit design or equivalent loads. To double the load capacity of each clock pulse driver, it is only necessary to couple another output amplifier to the secondary winding of the transformer 66 at a terminal 90 in FIG. 3 since the blocking oscillator circuit shown may drive two output amplifiers. For simplicity, each clock pulse driver in the system which will now be described includes only one output amplifier.

*Distribution System*

Only a few of the clock pulse drivers and load flip-flops which may be connected to the clock pulse distribution system have been shown in FIG. 1 but since each clock pulse driver may drive ten or twenty other clock pulse drivers or ten or more flip-flops, depending on the circuit design of the flip-flops employed, the system may obviously be expanded to include considerably more clock pulse drivers for driving a much greater number of loads in accordance with the concept of the present invention.

A clock pulse generator 101 provides clock pulses at a desired clock rate, such as at a 250 kc./sec. rate as in the present embodiment, to a novel clock pulse distribution system illustrated in FIG. 1. An ungated clock pulse driver 102 in one level of clock pulse drivers is driven by the pulses from the clock pulse generator 101. The clock pulse driver 102 transmits clock pulses to a plurality of ungated clock pulse drivers in a second level of clock pulse drivers through a lead 108, such as the clock pulse drivers 103 to 107 shown.

Each clock pulse driver in the second level, such as the clock pulse driver 103, drives a plurality of clock pulse drivers in a third level of clock pulse drivers. Each clock pulse driver in the third level, such as the clock pulse drivers 109 and 110, is employed to drive a plurality of gated flip-flops or load circuits. Four gated flip-flops 111 to 114 are shown connected to the clock pulse driver 109. All four are simultaneously triggered each time a clock pulse is transmitted because the clock pulse driver 109 which is not gated drives them all.

The clock pulse driver 110 is gated; therefore all of the flip-flops 115 to 118 which are driven by it are simultaneously triggered only when a gate signal is applied to its gate input terminal 119. The application of the gate signal is controlled by circuits (not shown) which may be part of either a computer or a data-processing system for which the pulse distribution system is provided or by other circuits (not shown) in separate apparatus, such as input and output equipment.

Although the clock pulse driver 110 is gated and the clock pulse driver 109 is not, the flip-flops 111 to 118 are triggered synchronously when both clock pulse drivers transmit clock pulses during a given clock pulse period because both clock pulse drivers are driven simultaneously by the clock pulse driver 103 through a lead 120.

Other clock pulse drivers in the second level, such as the clock pulse driver 105, drive clock pulse drivers in the third level, such as the clock pulse drivers 149 and 150, each of which drives a plurality of gated flip-flops or load circuits. Three gated flip-flops 151 to 153 are driven by the clock pulse driver 149, and four gated flip-flops 154 to 157 are driven by the clock pulse driver 150. All of the flip-flops 151 to 157 are triggered synchronously because the clock pulse drivers 149 and 150 are driven simultaneously by the clock pulse driver 105.

Since the clock pulse drivers 103 and 105 are driven simultaneously by the clock pulse driver 102, the clock pulse drivers, such as the clock pulse drivers 109, 110, 149 and 150, in the third level are driven synchronously. Accordingly, all of the flip-flops connected to the clock pulse drivers on the third level are triggered synchronously.

In order to maintain synchronous triggering of all the flip-flops in the system, the transmission time from the output terminal of a given clock pulse driver in one level to the input terminal of each clock pulse driver in the next level must be made substantially the same by using shielded low-inductance leads of substantially the same length to each driven clock pulse driver.

The clock pulse drivers in the third level are preferibly located as close as possible to the load circuits they must drive. If that is done, shielded low-inductance leads are not necessary between the output terminals of the third level clock pulse drivers and the load circuits.

The clock pulse distribution system illustrated may be expanded until the load capacity of each clock pulse driver in each level has been exceeded. If a larger number of loads are to be driven, the capacity of the clock pulse distribution system may be doubled by adding another output amplifier to the clock pulse driver 102 in a manner described with reference to FIG. 3. To further increase the load capacity, it is possible to add a second output amplifier to every clock pulse driver in both the second level and the third level of clock pulse drivers and, if necessary, to add more levels of clock pulse drivers.

Each gated flip-flop is representative of only one type of circuit load in a computer or data-processing system is to be synchronized. A description of one suitable gated flip-flop circuit may be found in a copending application filed by Robert R. Johnson on February 12, 1960, S. N. 8391, now U.S. Patent 3,077,984, for a Data Processing System. That flip-flop circuit consists of a pair of cross-coupled common-emitter transistor amplifiers each having its collector electrode clamped by a diode to prevent the transistor from saturating and to thereby avoid minority carrier storage effects. The logic input signals are coupled to the input terminals of the flip-flop by a clock pulse pedestal gating circuit which consists of a coupling diode reverse biased to prevent transmission of logic input signals unless a clock pulse is applied to the coupling diode through a capacitor.

As noted hereinbefore, the synchronous transfer of data may also be achieved by gating logic circuits in a computer or data processing system. That may be accomplished by applying the clock pulse pedestal gating technique to the logic circuits instead of to the flip-flops. Accordingly, although the load circuits are represented as flip-flops in the system of FIG. 1, the load circuits may be logic circuits such as diode AND and OR circuits.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A system for distributing synchronizing clock pulses to a large number of load circuits in a synchronously operated digital system from a single clock pulse generator comprising: a first switch having an input terminal and at least one output terminal; means for connecting said clock pulse generator to said input terminal of said first switch; a first plurality of switches, each switch having an input terminal and at least one output terminal; means for connecting said output terminal of said first switch to said input terminals of said first plurality of switches so that said first plurality of switches operates in synchronism; a second plurality of switches, each switch having an input terminal and at least one output terminal; means for connecting an output terminal of a given one of said switches of said first plurality of switches to input terminals of given switches of said second plurality of switcehs so that said second plurality of switches operates in synchronism; and means for selectively connecting some of said load circuits to an output terminal of a given switch of said second plurality of switches.

2. A system for distributing synchronizing clock pulses to a large number of load circuits in a synchronously operated digital system from a single clock pulse generator comprising: a first plurality of switches each switch having an input terminal and at least one output terminal; means for synchronously translating clock pulses from said clock pulse generator to said input terminal of each of said first plurality of switches; a second plurality of switches, each switch having an input terminal and at least one output terminal; means for connecting an output terminal of a given one of said switches of said first plurality of switches to input terminals of a given ones of said switches of said second plurality of switches for synchronously translating clock pulses from said first plurality of switches to said second plurality of switches; means for connecting a plurality of said load circuits to an output terminal of a given one of said switches of said second plurality of switches, and gating means for controlling at least some of said second plurality of switches for synchronously triggering predetermined load circuits with said clock pulses.

3. A clock pulse distribution system comprising: a clock pulse source; a first plurality of switches, each switch having an input terminal and at least one output terminal; a means for synchronously translating clock pulses from said source to said input terminal of each of said switches of said first plurality of switches; a second plurality of switches, each switch having an input terminal and at least one output terminal, each of said switches of said first and second plurality of switches being regenerative; a means for connecting and synchronously translating clock pulses from an output terminal of a given one of said switches of said first plurality of switches to input terminals of $n$ switches of said second plurality of switches where $n$ is an integer equal to or less than $m$ and $m$ represents the maximum number of switches which may be driven by a given one of said switches in said first plurality of switches; a plurality of load circuits divided into $n$ groups, one group being connected to an output terminal of a given one of said switches of said second plurality of switches, and gating means for controlling at least some of said second plurality of switches for synchronously controlling predetermined load circuits with said clock pulses.

4. A system for distributing synchronizing clock pulses to a number of load circuits in a digital data-processing system having a greater number of load circuits to be driven simultaneously than may be directly driven by a single clock pulse source, the combination comprising: a clock pulse generator; a group of $m$ switches where $m$ is an integer, each switch having an input terminal and an output terminal; means for coupling said clock pulse generator to input terminals of said group of switches for synchronously translating clock pulses therethrough; a plurality of switches arranged in $m$ groups of $n$ switches where $n$ is a number equal to or less than a maximum number of load circuits which may be driven by a given one of said switches in said group of $m$ switches, each of said plurality of switches having an input terminal and an output terminal; means for connecting the input terminals of switches in a given one of said $m$ groups of $n$ switches to the output terminal of a given switch of said first group of switches for synchronously translating clock pulses from said first group of switches to said plurality of switches; means for connecting a plurality of load circuits to the output terminal of each of said plurality of switches, gating means for controlling at least some of said plurality of switches for synchronously triggering predetermined load circuits with said clock pulses.

5. A system for distributing synchronizing clock pulses as defined in claim 4 wherein each of said switches is a regenerative switch.

References Cited in the file of this patent

UNITED STATES PATENTS

| | | |
|---|---|---|
| 2,798,667 | Spielberg et al. | July 9, 1957 |
| 2,927,732 | Rinder | Mar. 8, 1960 |
| 2,985,769 | Blount | May 23, 1961 |